United States Patent Office 3,021,425
Patented Feb. 13, 1962

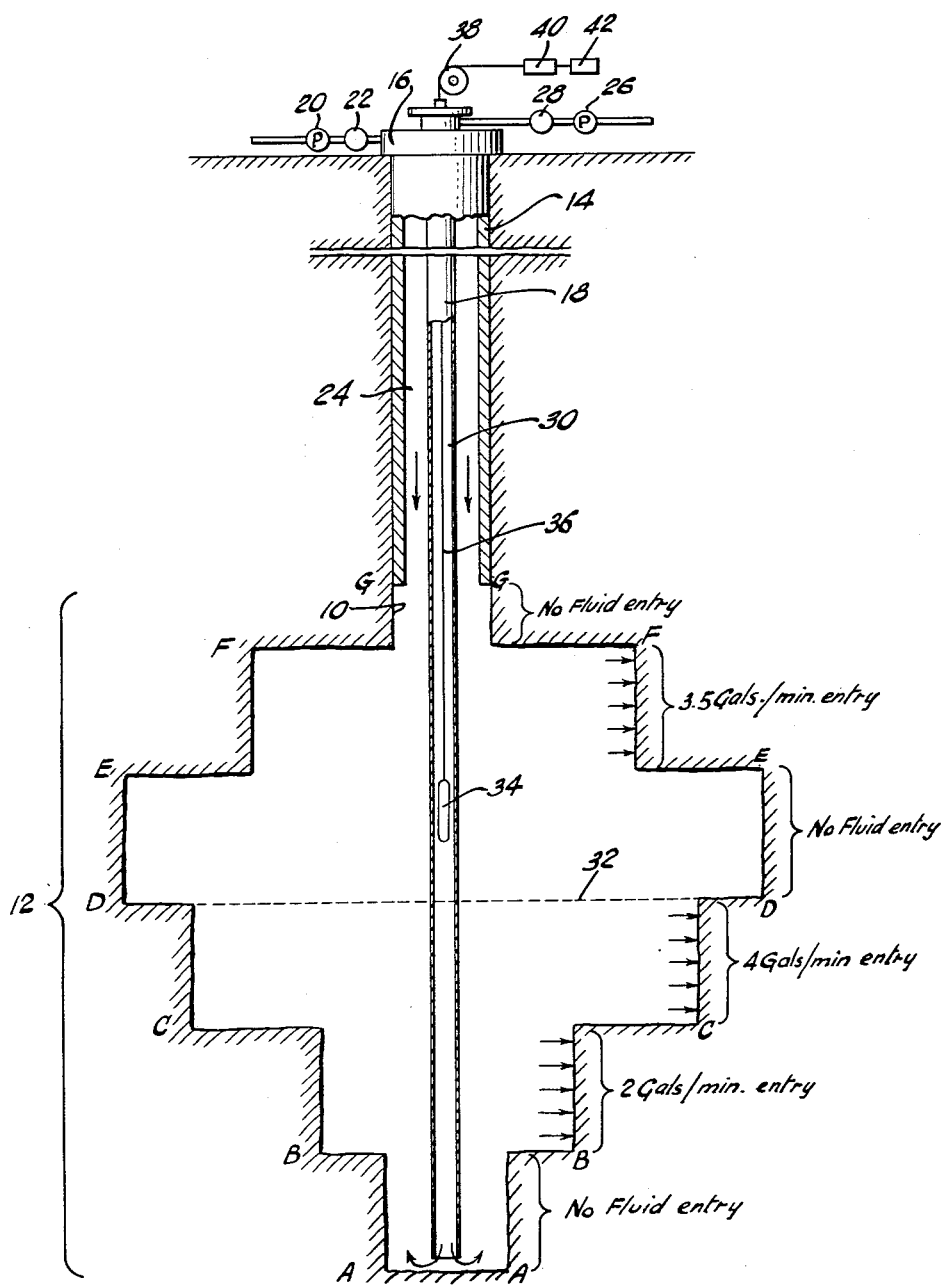

3,021,425
METHOD OF MEASURING BOREHOLE
CAPACITY
Dee B. Waldroop, Salem, Ill., assignor to Texaco Inc., New York, N.Y., a corporation of Delaware
Filed Dec. 6, 1957, Ser. No. 701,139
6 Claims. (Cl. 250—43.5)

This invention relates to well logging and more particularly to the measurement of the diameter or size of the borehole of an injection well.

It is well known to measure borehole diameters by using arm type caliper devices. However, these devices are ineffective in some instances, particularly when the cross sectional area of a well is non-circular. In these instances the actual area could be substantially different from the area measured by these caliper devices. Furthermore, the maximum diameter variations which can be measured are limited when calipers are used. Another disadvantage to using calipers is that the borehole must be free of obstructions in order to lower the caliper to the region of interest. Thus, the use of calipers in the bore of an injection well would ordinarily necessitate the removal of the well tubing before measurements could be made of the borehole diameter.

Accordingly, this invention provides a novel method of measuring borehole diameters without lowering calipers into the borehole.

This invention is particularly useful when it is desired to obtain measurement of borehole diameters of a zone in an injection well in which an injectivity profile has been made by a logging method such as that described in U.S.P. 2,700,734, granted to Egan and Herzog on January 25, 1955.

In the method disclosed in that patent two similar fluids are pumped down in the well, one of these fluids being pumped down through a string of tubing to a point below the formation to be examined, while the other fluid is pumped down through the annular space between the tubing and the casing or the walls of the hole. One of these fluids preferably that which is pumped down through the annular space between the tubing and the walls of the hole is made radioactive by the addition of a small amount of a radioactive substance, while the other fluid which is pumped down through the tubing is non-radioactive. These fluids will meet somewhere in the annulus above the lower end of the tubing and an interface will exist at that point. The depth or location of this interface will depend on the rates of injection of the fluids and the interface can be caused to move up or down through the annular space around the tubing by varying these rates of injection. The location of the interface is determined by passing a radiation detector preferably through the tubing and noting a change in the response of the detector as it passes from the radioactive fluid into the non-radioactive fluid or vice versa. The sum of the rates of injection of the two fluids is maintained constant and as indicated above by increasing the rate of injection of the radioactive liquid while decreasing the rate of injection of the non-radioactive liquid the interface can be made to move downwardly through the hole past the exposed walls or surface of the formation to be examined. By adjusting these rates of injection by increments while metering the injection fluids and noting the depth of the interface after each change, one can determine the rate at which the radioactive liquid is passing into the increment of the formation between successive noted depths.

In accordance with the measuring method of this invention, an injectivity profile log and a log indicating the velocity of a fluid interface in a borehole at a given fluid injection rate into the borehole are utilized to determine the borehole diameter or capacity.

In a preferred more specific method of this invention the diameter of a borehole is determined by first noting on an injectivity profile log of a borehole interval of interest the points or depths in the borehole at which the fluid interface was stabilized. Then the pumping rates of the two streams injected into the borehole are adjusted to stabilize the interface of the two streams at one end of the given borehole interval. The pumping rates of the two streams are then adjusted so that the interface moves from the one end of the interval to the other end of the interval. The time required for the interface to reach each of the stabilized interface locations noted in the injectivity profile log is observed so that the average velocity of the moving interface can be determined.

Since the injection rate into the borehole interval and the time required for the interface to reach the location of each of the stabilized interfaces noted in the profile log is known, the total volume of liquid entering each increment of the borehole interval, which increments are defined by the stabilized interfaces, can be readily determined. Furthermore, since the amount of liquid entering into each increment of the borehole interval is known from the profile log, the volume of liquid occupying the borehole in each increment can be determined by subtracting the amount of fluid which has entered into the formation within the increment from the total volume of water entering into that increment. Knowing the length of the increment and the volume of liquid occupying the borehole in the increment the average borehole diameter in this increment of the borehole interval can be readily determined.

For a better understanding of the invention reference may be had to the accompanying drawing in which the figure illustrates a vertical sectional view of the apparatus of this invention mounted in the borehole.

Referring to the drawing, a well or borehole 10 is shown as traversing a formation interval 12 within which interval it is desired to determine the borehole capacity. The upper portion of the well is shown as being provided with a casing 14 having a closed casing head 16. A string of tubing 18 passes through the casing head 16 and downwardly through the well to a point substantially at the lower limit of the formation interval 12. At the surface a pump 20 is connected to the casing head 16 through a meter 22 and is adapted to pump a stream of, preferably, water 24 downwardly into the well through the annular space between the casing 14 and the tubing 18. A small amount of radioactive material such, for example, as radioactive iodine in the form of sodium iodide may be added to the water 24 by means not shown, preferably before the water is taken into the pump 20. Another pump 26 is shown as connected through meter 28 to the upper end of the tubing 18 and is adapted to pump a non-radioactive water 30 downwardly through the tubing 18. The non-radioactive water 30 passes out of the bottom end of the tubing 18 and upwardly around the tubing 18 until it meets the radioactive water 24 to form an interface 32. It will be seen that if the pumps 20 and 26 are adjusted to change their rates of pumping while the total amount of water pumped by both pumps remains constant the interface 32 will be caused to move up or down in the hole depending on the two pumping rates.

Shown as suspended within the tubing 18 is a radioactivity logging instrument 34 containing a detector of gamma rays, the output of which is conducted upwardly through the suspended cable 36. This cable passes over a suitable measuring device 38 which continuously indicates the depth of instrument 34 in the hole and then to a suitable amplifier 40 and a recorder 42. When the instrument 34 is lowered down through the tubing, it will, of course, respond to the radioactivity of the water until it passes the interface 32 when the detector output will suddenly decrease. A record of the output of the detector is made continuously by the recorder 42 and this is correlated with the depth of the detector 34 in the borehole 10 as measured by the cable measuring device 38. Thus by passing the detector 34 through a borehole 10 and comparing points in the record at which the detector 34 passes into or out of the radioactive fluid with the depth in the borehole 10 at which those points are registered an accurate measurement is made of the depth of the interface 32.

It can be seen that as the ratio of the injection rates of the radioactive fluid 24 and the non-radioactive fluid 30 are changed the interface 32 between the fluids will move along the formation to be examined. The sum of the rates of injection of radioactive water 24 and non-radioactive water 30 is always held constant to maintain constant borehole pressure.

To more clearly describe the method of measuring the borehole diameter it is assumed that the interfaces during the injectivity profile run were stabilized at AA, BB, CC, DD, EE, FF, GG and that the injection rate between interfaces AA and BB was 0, between interfaces BB and CC was 2 gallons per minute, between interfaces CC and DD was 4 gallons per minute, between interfaces DD and EE was 0, between EE and FF was 3.5 gallons per minute, and between interfaces FF and GG was 0.

The total injection through the tubing 18 is assumed to be held constant at a rate of 10 gallons per minute; however, this rate may be increased or decreased as long as the total injection rate is at least equal to the total rate of the fluid passing into the subsurface formation in a given borehole interval.

Under these conditions, the interface is located at the horizon AA from which it will be moved in an upward direction. The distances between the horizons can be any distance.

If the interface is observed to move from AA to BB in ½ minute there is a borehole capacity of 5 gallons plus the volume occupied by the tubing 18 in this interval since there is no fluid loss and the injection is at the rate of 10 gallons per minute.

Movement of the interface from BB to CC in 2.3 minutes shows a capacity of 20.7 gallons plus the volume occupied by the tubing 18 in this interval since there is a 2.0 gallons per minute loss into the formation between BB—CC. The average rate of flow upwardly from BB to CC is 9 gallons per minute.

The movement of the interface from CC to DD in 13.9 minutes indicates a borehole capacity of 83.4 gallons plus the volume occupied by the tube 18 in this interval. The flow rate average between CC and DD is 6 gallons per minute since there is a 4 gallons per minute loss between CC and DD.

There is no loss of fluid to the formation between horizons DD and EE, therefore the flow rate average between these points is 4 gallons per minute. Consequently the movement of the interface from DD to EE in 32.6 minutes indicates a capacity of 130.4 gallons plus the volume occupied by the tubing 18 between DD and EE.

With a flow rate of 4 gallons per minute at EE, 3½ gallons per minute loss to the formation and movement of the interface from EE to FF in 20.4 minutes the borehole capacity of the increment from EE to FF is 49.9 gallons plus the volume occupied by the tubing 18 for this interval. The average flow rate between EE and FF is 2.25 gallons per minute. Consequently ½ gallon per minute is moving upwardly in the annular space between the tube 18 and the casing 14 to enable hole size determination above the point of last water entry.

Although movement of the interface in an upward direction has been discussed hereinabove, it should be understood that the same data may likewise be determined if surface injection is through the annulus between the tube and the casing with movement of the interface in the downward direction. Furthermore, by injecting the fluid through the casing the borehole size can be determined to the lowest point of water entry with the movement of the interface in a downward direction without the use of tubing in the borehole. In this case the correction for volume occupied by the tubing is not necessary.

It should be noted that the fluid interface may be detected by other well-known means than the above described means which employ a radioactive detector and a radioactive material.

It should be understood that during the interface velocity logging run the location of the interface may be continuously determined by following the interface with the detector; however, if preferred, the detector may be positioned only at the successive horizons at which the interface was stabilized during the profile logging run. Furthermore, it should be understood that the interface velocity log may be produced before the injectivity profile log is produced and if desired both logs may be produced during the same run. In the latter case the different rates of fluid injection into the borehole of one of the streams and the time required to move the interface from one stabilized position to the next must be noted.

It can be seen that such borehole size information is of value in determining among other things, (1) type and procedure for remedial work; (2) volume material required for plugging; (3) location of shot and unshot portions; (4) location of shale intervals in certain instances; (5) location of permeable zone or zones in acid soluble formations previously acidized; and (6) surface area exposed for injectivity and/or productivity determinations.

Obviously, many modifications and variations of the invention as hereinabove set forth may be made without departing from the spirit and scope thereof and therefore only such limitations should be imposed as are indicated in the appended claims.

I claim:

1. An improved method of determining the average diameter of each of a plurality of increments in a given interval of a well bore which comprises introducing a fluid into said borehole in a downward direction, simultaneously introducing another fluid through said borehole in an upward direction so as to establish an interface between said fluids, determining the depth in the hole of said interface, varying the ratio of the rates of the two fluids being introduced into the hole while maintaining constant the sum of the rates of the two fluids so as to cause said interface to move along the walls of said borehole to another depth, again determining the depth of the interface, repeating these operations while noting the distance moved by the interface for each change in the ratio of the rates of the two fluids being pumped into the borehole, the increments in the well bore interval being defined by said determined depths, the flow rate into each of said increments being equal to the corresponding amount of change of the flow rate of one of the fluids injected into the borehole, then adjusting the rates of flow of the two fluids so as to establish the interface at one vertical limit of the given interval of said well bore, changing the rate of flow of one of said fluids by a value at least equal to the sum of the flow rates into each of the plurality of increments in the given interval of said well bore and noting the time required for the interface to pass through each of said plurality of increments.

2. An improved method of determining the average diameter of a given interval of a well bore traversing subsurface formations which comprises introducing a first fluid into said bore below said interval, simultaneously introducing a second fluid into said bore above said interval so as to establish an interface at one limit of said interval, adjusting the rates of flow of each of the fluids so as to move the interface to the other limit of said interval while maintaining a constant total rate of flow of the two fluids, the amount of change of the flow rate being equal to the flow rate through the wall of said interval of the well bore, and noting the time required for said interface to travel between said limits.

3. An improved method of determining the average diameter of a well bore traversing a given formation which comprises introducing a first fluid into said bore below said formation, introducing a second fluid into said bore above said formation to establish an interface between said fluids at one vertical limit of said formation, continuously adding a small amount of radioactive material to one of said fluids, adjusting the rates of flow of each of the fluids so as to move the interface to the other vertical limit of the formation while maintaining a constant total rate of flow of the two fluids, the amount of change of the flow rate being equal to the flow rate into the formation, again adjusting the rate of flow of said fluids to a predetermined value sufficient to move said interface between said vertical limits of said formation and noting the time required for said interface to travel between said limits.

4. An improved method of determining the average diameter of each of a plurality of increments in a given interval of a well bore which comprises introducing a fluid into said borehole in a downward direction, simultaneously introducing another fluid through said borehole in an upward direction so as to establish an interface between said fluids, continuously adding a small amount of radioactive material to one of said fluids, determining the depth in the hole of said interface, varying the ratio of the rates of the two fluids being introduced into the hole while maintaining constant the sum of the rates of the two fluids so as to cause said interface to move along the walls of said borehole to another depth, again determining the depth of the interface, repeating these operations while noting the distance moved by the interface for each change in the ratio of the rates of the two fluids being pumped into the borehole, the increments in the well bore interval being defined by said determined depths, the flow rate into each of said increments being equal to the corresponding amount of change of the flow rate of one of the fluids injected into the borehole, then adjusting the rates of flow of the two fluids so as to establish the interface at one vertical limit of the given interval of said well bore, changing the rate of flow of one of said fluids by a value at least equal to the sum of the flow rates into each of the plurality of increments in the given interval of said well bore and noting the time required for the interface to pass through each of said plurality of increments.

5. An improved method of determining the average diameter of a given interval of a well bore traversing subsurface formations which comprises introducing a first fluid into said bore below said interval, simultaneously introducing a second fluid into said bore above said interval so as to establish an interface at one limit of said interval, continuously adding a small amount of radioactive material to one of said fluids, adjusting the rates of flow of each of the fluids so as to move the interface to the other limit of said interval while maintaining a constant total rate of flow of the two fluids, the amount of change of the flow rate being equal to the flow rate through the wall of said interval of the well bore, and noting the time required for said interface to travel between said limits.

6. An improved method of determining the average diameter of a well bore traversing a given formation which comprises continuously pumping a first fluid down and introducing same into said bore below said formation, continuously pumping a second fluid down into said bore above said formation to establish an interface between said first and second fluids at one vertical limit of said formation, adjusting the rates of flow of each of the fluids at the surface so as to move the interface to the other vertical limit of the formation while maintaining a constant total rate of flow of the two fluids, the amount of change of the flow rates being equal to the flow rate into the formation, again adjusting the rate of flow at the surface of said fluids to said predetermined values sufficient to move said interface between said vertical limits of said formation while maintaining said constant total rate of flow and noting the time required for said interface to travel between said limits.

References Cited in the file of this patent

UNITED STATES PATENTS

| | | |
|---|---|---|
| 2,700,734 | Egan et al. | Jan. 25, 1955 |
| 2,775,121 | Bennett et al. | Dec. 25, 1956 |
| 2,869,642 | McKay et al. | Jan. 20, 1959 |